United States Patent Office 3,020,307
Patented Feb. 6, 1962

3,020,307
CYCLOALKENYL BORATES AND PREPARATION THEREOF
John P. Luvisi, Park Ridge, Ill., assignor to Universal Oil Products Company, Des Plaines, Ill., a corporation of Delaware
No Drawing. Filed Dec. 23, 1959, Ser. No. 861,462
17 Claims. (Cl. 260—462)

This invention relates to a process for preparing novel compositions of matter and to a method for preparing mono- and polycycloalkenyl borates.

It has now been discovered that the novel compositions of matter prepared according to the process of this invention, namely, cycloalkenyl borates, will find a wide variety of uses in the chemical field. (For the purposes of the invention the term "cycloalkenyl" will refer to cycloalkenyl as well as bicycloalkenyl.) For example, the compounds may be utilized as antiozonants and antioxidants in organic materials which are normally susceptible to oxidative deterioration such as, for example, rubber, both natural and synthetic, gasolines, oils, both inedible and edible such as tung oil, vegetable oil, menhaden oil, rapeseed oil, cottonseed oil, etc., lard, grease, etc. Furthermore, certain of the cycloalkenyl borates may be used in chemical warfare or in policing actions as lachrymatory agents. In addition, the cycloalkenyl borates may be used per se or halogenated using chlorine, bromine, etc., or condensed with halo substituted organic compounds such as, for example, hexachlorocyclopentadiene to form compounds possessing insecticidal properties, especially against houseflies.

The physical properties of the resultant halogenated compounds thus prepared and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents or dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

It is therefore an object of this invention to provide a method for preparing novel compositions of matter comprising cycloalkenyl borates.

Another object of this invention is to prepare cycloalkenyl borates by condensing alkenyl borates with conjugated unsaturated hydrocarbons.

One embodiment of this invention is found in a process for the preparation of a cycloalkenyl borate which comprises condensing a hydrocarbon selected from the group consisting of alkadienes and cycloalkadienes with an alkenyl borate at condensation conditions to form the desired cycloalkenyl borate.

A further embodiment of this invention is found in a process for the preparation of a cycloalkenyl borate which comprises condensing a conjugated cycloalkadiene with an alkenyl borate at a temperature in the range of from about 25° to about 150° C. and at a pressure in the range of from about atmospheric to about 100 atmospheres to form the desired cycloalkenyl borate.

Yet another embodiment of this invention resides in a cycloalkenyl borate containing only carbon, hydrogen, oxygen and boron atoms.

A specific embodiment of this invention resides in a process for the preparation of a cycloalkenyl borate which comprises condensing 1,3-butadiene with trivinyl borate at a temperature in the range of from about 25° to about 150° C. and at a pressure in the range of from about atmospheric to about 100 atmospheres to form tris-(3-cyclohexen-1-yl) borate.

Another specific embodiment of the invention comprises tris-(5-norbornen-2-yl) borate.

Other objects and embodiment referring to alternative alkadienes, cycloalkadienes and alkenyl borates will be found in the following further details description of the invention.

The process of this invention in which the alkadiene or cycloalkadiene is condensed with the alkenyl borate will take place at a temperature in the range of from about atmospheric (25° C.) to about 150° C. or more and often preferably at a temperature in the range of from about 100° to about 130° C., the temperature depending upon the particular reactants which are undergoing condensation. Generally, the reaction will taken place at atmospheric pressure; however, if higher temperatures are used when condensing a lower boiling diene with the alkenyl borate, superatmospheric pressures ranging from about 2 to about 100 atmospheres or more will be used, the amount of pressure being necessary to maintain at least a major portion of the reactants in the liquid phase. In addition, if so desired, the reaction will take place in the presence of substantially inert organic solvents, said solvents including aromatic hydrocarbons such as benzene, toluene, o-xylene, m-xylene, p-xylene, ethyl benzene, etc.; paraffinic hydrocarbons including straight chain paraffins such as pentane, hexane, heptane, etc., cyclic paraffins such as cyclopentane, cyclohexane, methylcyclo-pentane, etc.; alcohol such as methyl alcohol, ethyl alcohol, propyl alcohol, etc.; ethers such as dimethyl ether, diethyl ether, dipropyl ether, etc.

Diolefinic conjugated hydrocarbons containing only carbon and hydrogen atoms which may be reacted with the alkenyl borates in the process of the present invention include (1) straight chain conjugated diolefins having the general formula:

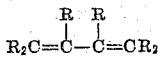

in which the R's are independently selected from the group consisting of alkyl or hydrogen radicals, at least one R of each of the double bonded carbon atoms being hydrogen; or (2) conjugated cycloalkadienes having the general formula:

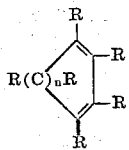

in which the R's are independently selected from the group consisting of hydrogen or alkyl radicals and $n$ is one or two. Examples of these compounds include conjugated alkadienes such as 1,3-butadiene,
2-methyl-1,3-butadiene (isoprene),
2,3-di-methyl-1,3-butadiene,
1,3-pentadiene,
2-methyl-1,3-pentadiene,
3-methyl-1,3-pentadiene,
2,3-dimethyl-1,3-pentadiene,
2-ethyl-1,3-pentadiene,
3-ethyl-1,3-pentadiene,
2,4-hexadiene,
3-methyl-2,4-hexadiene,
3,4-dimethyl-2,4-hexadiene,
3-ethyl-2,4-hexadiene,
3,4-diethyl-2,4-hexadiene,
1,3-hexadiene,
2-methyl-1,3-hexadiene,
3-methyl-1,3-hexadiene,
2-ethyl-1,3-hexadiene,
3-ethyl-1,3-hexadiene,
2,3-diethyl-1,3-hexadiene,
2,4-heptadiene,
3-methyl-2,4-heptadiene,
4-methyl-2,4-heptadiene,
3,4-dimethyl-2,4-heptadiene,
3-ethyl-2,4-heptadiene,
4-ethyl-2,4-heptadiene,
3,4-diethyl-2,4-heptadiene,
1,3-heptadiene,
2-methyl-1,3-heptadiene,
3-methyl-1,3-heptadiene,
2,3-dimethyl-1,3-heptadiene,
2-ethyl-1,3-heptadiene,
3-ethyl-1,3-heptadiene,
2,3-diethyl-1,3-heptadiene, etc.;

cycloalkadienes and alkyl substituted cycloalkadienes such as 1,3-cyclopentadienes which for purposes of this invention will be designated as cyclopentadienes and include cyclopentadiene, 1-methyl-cyclopentadiene,
2-methylcyclopentadiene,
5-methylcyclopentadiene,
1,2-dimethylcyclopentadiene,
1,3-dimethylcyclopentadiene,
5,5-dimethylcyclopentadiene,
1,2,3-trimethylcyclopentadiene,
1,2,3,4-tetramethylcyclopentadiene,
hexamethylcyclopentadiene,
1-ethylcyclopentadiene,
2-ethylcyclopentadiene,
5-ethylcyclopentadiene,
1,2-diethylcyclopentadiene,
1,3-diethylcyclopentadiene,
5,5-diethylcyclopentadiene,
1,2,3-triethylcyclopentadiene,
1,2,3,4-tetraethylcyclopentadiene,
hexaethylcyclopentadiene, etc.

It is also contemplated within the scope of this invention that conjugated cycloalkadienes such as 1,3-cyclohexadiene,
1-methyl-1,3-cyclohexadiene,
2-methyl-1,3-cyclohexadiene,
5-methyl-1,3-cyclohexadiene,
1,2-dimethyl-1,3-cyclohexadiene,
1,3-dimethyl-1,3-cyclohexadiene,
1,4-dimethyl-1,3-cyclohexadiene,
5,6-dimethyl-1,3-cyclohexadiene,
1,2,3-trimethyl-1,3-cyclohexadiene,
1,2,4-trimethyl-1,3-cyclohexadiene,
1,4,5-trimethyl-1,3-cyclohexadiene,
1,5,6-trimethyl-1,3-cyclohexadiene, etc., may also be used although not necessarily with equivalent results.

Alkenyl borates containing only carbon, hydrogen, oygen and boron atoms which may be condensed with the aforesaid olefinic hydrocarbons according to the process of this invention possess the generic formula:

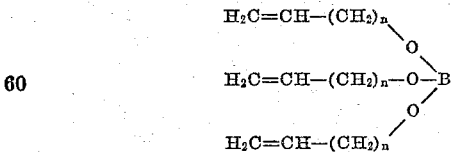

in which $n$ is an integer of from 0 to 10, said borates including trivinyl borate, trially borate, trimethallyl borate, tricrotonyl borate, tripentenyl borate, trihexenyl borate, triheptenyl borate, trioctenyl borate, trinonenyl borate, tridecenyl borate, etc. It is to be understood that in the formula of the alkenyl borate the double bond may be at the end of the chain or may be internal and that the aforementioned conjugated alkadienes, cycloalkadienes and alkenyl borates are only representatives of the class of compounds which may be used and that this invention is not necessarily limited thereto.

An example of the condensation reaction of the present process may be illustrated by the following equations:

(1)

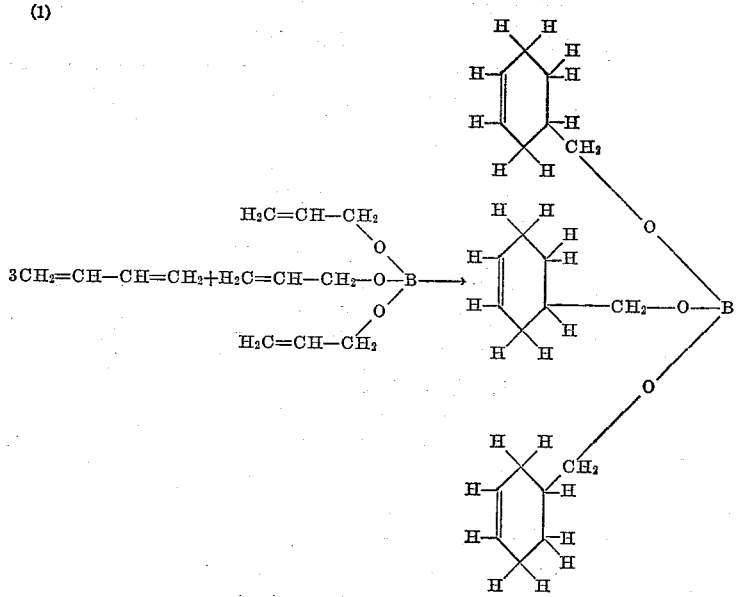

(2)

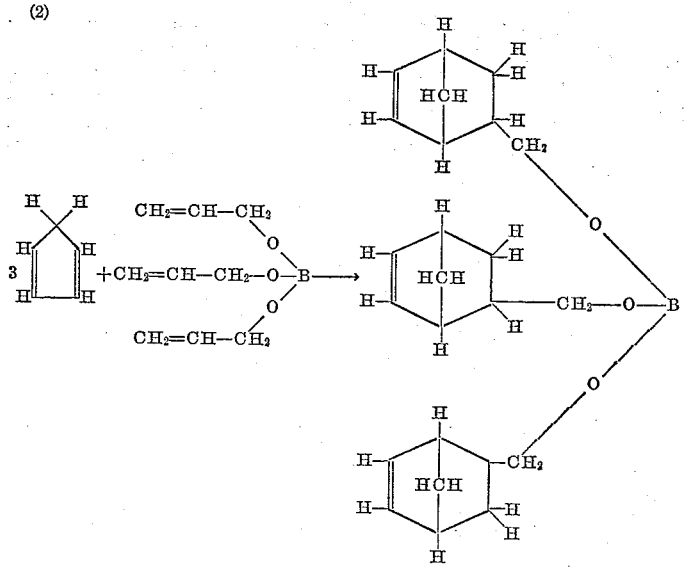

in which triallyl borate is reacted with 1,3-butadiene and cyclopentadiene respectively, to yield tris-(3-cyclohexen-1-yl) borate and tris-(5-norbornen-2-yl) borate. Although the above set forth equations illustrate the reaction between three moles of the alkadiene and cycloalkadiene with one mole of the alkenyl borate it is contemplated within the scope of the invention that one or two moles of the alkadiene may be reacted with one mole of the alkenyl borate to form a cycloalkenyl alkenyl borate or a bis-(cycloalkenyl) alkenyl borate respectively.

The process of the present invention may be effected in any suitable manner and may comprise either a batch or a continuous type operation. For example, when a batch type operation is used, a quantity of the starting materials comprising the alkenyl borate and, if so desired, an inert organic solvent is placed in a condensation apparatus provided with heating and mixing means. The flask is adjusted to the desired temperature and the conjugated alkadiene or cycloalkadiene containing only hydrogen and carbon atoms is added thereto at a predetermined rate, the temperature of the flask being maintained at the desired level for a predetermined residence time. At the end of this time the flask and contents thereof are allowed to cool to room temperature and the desired reaction product is separated from unreacted starting materials by conventional means such as fractional distillation, crystallization, etc. Alternatively, the reactants and solvent, if any, may be first admixed and then heated to the desired reaciton temperature.

Another method of effecting the condensation reaction of the present invention is by a continuous type operation. In this type of operation the starting materials comprising the alkenyl borate and the cycloalkadiene or alkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite or the like. If so desired, inert organic solvents of the type hereinbefore set forth may be added through a separate line or admixed with one or the other of the starting materials prior to entry into said reactor and charged thereto in a single line. The reaction product is continuously withdrawn from the reactor, separated from the reactor effluent and purified by conventional means hereinbefore set forth, while the unreacted starting materials are separated and recharged to the reactor as a portion of the feed stock.

Examples of cycloalkenyl borates which are prepared according to the process of this invention include (3-cyclohexen-1-yl) divinyl borate,
bis-(cyclohexen-1-yl) vinyl borate,
tris-(3-cyclohexen-1-yl) borate,
[(3-cyclohexen-1-yl)methyl] diallyl borate,
bis-[(3-cyclohexen-1-yl)methyl] allyl borate,
tris-[(3-cyclohexen-1-yl)methyl] borate,
[(3-cyclohexen-1-yl)ethyl] dibutenyl borate,
bis-[(3-cyclohexen-1-yl)ethyl] butenyl borate,
tris-[(3-cyclohexen-1-yl)ethyl] borate,
[(3-cyclohexen-1-yl)propyl] dipentenyl borate,
bis-[(3-cyclohexen-1-yl)propyl] pentenyl borate,
tris-[(3-cyclohexen-1-yl)propyl] borate,
[(3-cyclohexen-1-yl)butyl] dihexenyl borate,
bis-[(3-cyclohexen-1-yl)butyl] hexenyl borate,
tris-[(3-cyclohexen-1-yl)butyl] borate,
(4-methyl-3-cyclohexen-1-yl) divinyl borate,
bis-(4-methyl-3-cyclohexen-1-yl) vinyl borate,
tris-(4-methyl-3-cyclohexen-1-yl) borate,
[(4-methyl-3-cyclohexen-1-yl)methyl] diallyl borate,
bis-[(4-methyl-3-cyclohexen-1-yl)methyl] allyl borate,
tris-[(4-methyl-3-cyclohexen-1-yl)methyl] borate,
[(4-methyl-3-cyclohexen-1-yl)ethyl] dibutenyl borate,
bis-[(4-methyl-3-cyclohexen-1-yl)ethyl] butenyl borate,
tris-[(4-methyl-3-cyclohexen-1-yl)ethyl] borate,
[(4-methyl-3-cyclohexen-1-yl)propyl] dipentenyl borate,
bis-[(4-methyl-3-cyclohexen-1-yl)propyl] pentenyl borate,
tris-[(4-methyl-3-cyclohexen-1-yl)propyl] borate,
[(4-methyl-3-cyclohexen-1-yl)butyl] dihexenyl borate,
bis-[(4-methyl-3-cyclohexen-1-yl)butyl] hexenyl borate,
tris-[(4-methyl-3-cyclohexen-1-yl)butyl] borate, etc.;
(5-norbornen-2-yl) divinyl borate,
bis-(5-norbornen-2-yl) vinyl borate,
tris-(5-norbornen-2-yl) borate,
[(5-norbornen-2-yl)methyl] diallyl borate,
bis-[(5-norbornen-2-yl)methyl] allyl borate,
tris-[(5-norbornen-2-yl)methyl] borate,
[(5-norbornen-2-yl)ethyl] dibutenyl borate,
bis-[(5-norbornen-2-yl)ethyl] butenyl borate,
tris-[(5-norbornen-2-yl)ethyl] borate,
[(5-norbornen-2-yl)propyl] dipentenyl borate,
bis-[(5-norbornen-2-yl)propyl] pentenyl borate,
tris-[(5-norbornen-2-yl)propyl] borate,
[(5-norbornen-2-yl)butyl] dihexenyl borate,
bis-[(5-norbornen-2-yl)butyl] hexenyl borate,
tris-[(5-norbornen-2-yl)butyl] borate, etc.

It is to be understood that the aforementioned cycloalkenyl borates are only representatives of the class of compounds which may be prepared and that the present invention is not necessarily limited thereto.

The following examples are given to illustrate the process of the present invention which, however, are not intended to limit the generally broad scope of the present invention in strict accordance therewith.

*Example I*

A mixture of 20 g. (0.3 mole) of cyclopentadiene and 18 g. (0.1 mole) of triallyl borate in 50 cc. of toluene was heated under reflux at a temperature of approximately 124°–130° C. for a period of about 22 hours. At the end of this time the reaction mixture was allowed to cool to room temperature and the toluene removed by vacuum. The desired product comprising 33 g. of an oil boiling at 183° C. at 0.3 mm. Hg was obtained. Analysis: Found B, 2.7%; calculated for $C_{21}H_{27}O_3B_1$; B, 3%. This corresponds to tris-[(5-norbornen-2-yl)methyl] borate.

*Example II*

A solution of 20 g. (0.3 mole) of cyclopentadiene and 14 g. (0.1 mole) of trivinyl borate in 50 cc. of xylene is refluxed for a period of approximately 20 hours. At the end of this time the flask and contents thereof are allowed to cool to room temperature and the xylene is removed in vacuum. The resulting reaction product is further distilled in vacuo and the cut comprising tris-(5-norbornen-2-yl) borate is recovered.

*Example III*

In this example a solution of 17 g. (0.3 mole) of 1,3-butadiene and 18 g. (0.1 mole) of triallyl borate is refluxed for a period of about 20 hours in 50 cc. of toluene, after which the product is recovered and treated as described of the products of Examples I and II above. The oil comprising tris-[(3-cyclohexen-1-yl)methyl] borate is recovered therefrom.

*Example IV*

A solution of 17 g. (0.3 mole) of 1,3-butadiene and 14 g. (0.1 mole) of trivinyl borate in 50 cc. of toluene is treated as described in Examples I to III above. The desired product, comprising tris-(3-cyclohexen-1-yl) borate is recovered.

*Example V*

In this example 20 g. (0.3 mole) of 2-methyl-1,3-butadiene (isoprene) and 14 g. (0.1 mole) of trivinyl borate in 50 cc. of toluene is refluxed for a period of about 20 hours. The desired reaction product comprising tris-(4-methyl-3-cyclohexen-1-yl) borate is recovered as described in the aforementioned examples.

*Example VI*

A mixture of 7 g. (0.1 mole) of cyclopentadiene and 18 g. (0.1 mole) of triallyl borate in 50 cc. of toluene is heated under reflux for a period of about 20 hours. At the end of this time the mixture is cooled and the toluene is removed in vacuum. The desired product comprising [(5-norbornen-2-yl)methyl] diallyl borate is separated and recovered.

*Example VII*

In this experiment a mixture of 11 g. (0.2 mole) of 1,3-butadiene and 14 g. (0.1 mole) of trivinyl borate in 50 cc. of toluene is refluxed for a period of about 20 hours. At the end of this time the toluene is removed in vacuum and the desired product comprising bis-(3-cyclohexen-1-yl) vinyl borate is recovered.

*Example VIII*

An insecticidal composition is prepared by condensing a molecular proportion of tris-[(5-norbornen-2-yl)methyl)] borate which was prepared according to the process of Example I above with three molecular proportions of hexachlorocyclopentadiene. One gram of the resulting compound is dissolved in 2 cc. of benzene and the resulting solution is added to 100 cc. of water using Triton X–100 as an emulsifying agent. The solution is sprayed into a cage containing houseflies and will cause a 100% knockdown. Similar insecticidal tests using compounds prepared according to Examples II to VII above which are composited with halogenated compounds will show similar results.

I claim as my invention:

1. A process for the preparation of a cycloalkenyl borate which comprises condensing a hydrocarbon selected from the group consisting of alkadienes and cycloalkadienes with an alkenyl borate at condensation conditions to form the desired cycloalkenyl borate, said alkenyl borate being of the formula:

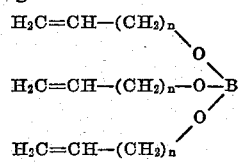

in which $n$ is an integer of from 0 to 10.

2. A process for the preparation of a cycloalkenyl borate which comprises condensing a hydrocarbon selected from the group consisting of alkadienes and cycloalkadienes with an alkenyl borate at a temperature in the range of from about 25° to about 150° C. and at a pressure in the range of from about atmospheric to about 100 atmospheres, said alkenyl borate being of the formula:

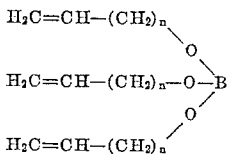

in which $n$ is an integer of from 0 to 10.

3. A process for the preparation of a cycloalkenyl borate which comprises condensing a conjugated alkadiene hydrocarbon with an alkenyl borate at a temperature in the range of from about 25° to about 150° C. and at a pressure in the range of from about atmospheric to about 100 atmospheres, said alkenyl borate being of the formula:

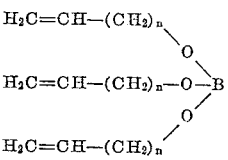

in which $n$ is an integer of from 0 to 10.

4. A process for the preparation of a cycloalkenyl borate which comprises condensing a conjugated cycloalkadiene hydrocarbon with an alkenyl borate at a temperature in the range of from about 25° to about 150° C. and at a pressure in the range of from about atmospheric to about 100 atmospheres, said alkenyl borate being of the formula:

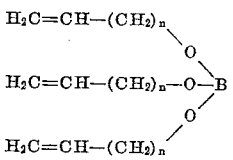

in which $n$ is an integer of from 0 to 10.

5. A process for the preparation of a cycloalkenyl borate which comprises condensing an alkenyl borate with 1,3-butadiene at a temperature in the range of from about 25° to about 150° C. and at a pressure in the range of from about atmospheric to about 100 atmospheres, said alkenyl borate being of the formula:

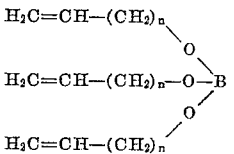

in which $n$ is an integer of from 0 to 10.

6. A process for the preparation of a cycloalkenyl borate which comprises condensing an alkenyl borate with cyclopentadiene at a temperature in the range of from about 25° to about 150° C. and at a pressure in the range of from atmospheric to about 100 atmospheres, said alkenyl borate being of the formula:

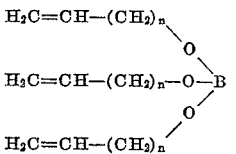

in which $n$ is an integer of from 0 to 10.

7. A process for the preparation of a cycloalkenyl borate which comprises condensing an alkenyl borate with 2-methyl-1,3-butadiene at a temperature in the range of from about 25° to about 150° C. and at a pressure in the range of from about atmospheric to about 100 atmospheres, said alkenyl borate being of the formula:

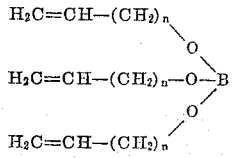

in which $n$ is an integer of from 0 to 10.

8. A process for the preparation of a bicycloalkenyl borate which comprises condensing an alkenyl borate with 5-methylcyclopentadiene at a temperature in the range of from about 25° to about 150° C. and at a pressure in the range of from about atmospheric to about 100 atmospheres, said alkenyl borate being of the formula:

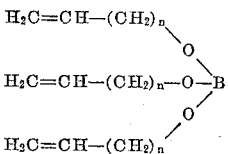

in which $n$ is an integer of from 0 to 10.

9. A process which comprises condensing 1,3-butadiene with trivinyl borate at a temperature in the range of from about 25° to about 150° C. and at a pressure in the range of from about atmospheric to about 100 atmospheres to form tris-(3-cyclohexen-1-yl) borate.

10. A process which comprises condensing cyclopentadiene with trivinyl borate at a temperature in the range of from about 25° to about 150° C. and at a pressure in the range of from about atmospheric to about 100 atmospheres to form tris-(5-norbornen-2-yl) borate.

11. A process which comprises condensing cyclopentadiene with triallyl borate at a temperature in the range of from about 25° to about 150° C. and at a pressure in the range of from about atmospheric to about 100 atmospheres to form tris-[(5-norbornen-2-yl)methyl] borate.

12. A process which comprises condensing 1,3-butadiene with triallyl borate at a temperature in the range of from about 25° to about 150° C. and at a pressure in the range of from about atmospheric to about 100 atmospheres to form tris-[(3-cyclohexen-1-yl)methyl] borate.

13. A process which comprises condensing 2-methyl-1,3-butadiene with trivinyl borate at a temperature in the range of from about 25° to about 150° C. and at a pressure in the range of from about atmospheric to about 100 atmospheres to form tris-(4-methyl-3-cyclohexen-1-yl) borate.

14. Tris-(5-norbornen-2-yl) borate.
15. Tris-[(5-norbornen-2-yl)methyl] borate.
16. [(5-norbornen-2-yl)methyl] diallyl borate.
17. A compound selected from the group consisting of tris-(5-norbornen-2-yl) borate, tris-[(5-norbornen-2-yl)methyl] borate, and [(5-norbornen-2-yl)methyl] diallyl borate.

References Cited in the file of this patent

UNITED STATES PATENTS

| | | |
|---|---|---|
| 2,160,942 | Britton et al. | June 6, 1939 |
| 2,413,718 | Lincoln et al. | Jan. 7, 1947 |
| 2,803,662 | Stoll | Aug. 20, 1957 |
| 2,884,441 | Groszos | Apr. 28, 1959 |
| 2,921,954 | Ramsden | Jan. 19, 1960 |